United States Patent [19]

Miller

[11] Patent Number: 4,964,888

[45] Date of Patent: Oct. 23, 1990

[54] MULTIPLE ZONE ADSORPTION PROCESS

[75] Inventor: Geoffrey Q. Miller, Chestnut Ridge, N.Y.

[73] Assignee: UOP, Des Plaines, Ill.

[21] Appl. No.: 457,600

[22] Filed: Dec. 27, 1989

[51] Int. Cl.⁵ .............................................. B01D 53/04
[52] U.S. Cl. ........................................... 55/58; 55/59; 55/62; 55/68; 55/74; 55/75
[58] Field of Search .................... 55/25, 26, 31, 33, 58, 55/59, 62, 68, 74, 75

[56] References Cited

U.S. PATENT DOCUMENTS

| | | | |
|---|---|---|---|
| 3,150,942 | 9/1964 | Vasan | 55/31 |
| 3,176,444 | 4/1965 | Kiyonaga | 55/58 X |
| 4,054,428 | 10/1977 | Foltz | 55/33 |
| 4,264,340 | 4/1981 | Sircar et al. | 55/31 X |
| 4,636,225 | 1/1987 | Klein et al. | 55/31 |
| 4,717,398 | 1/1988 | Pearce | 55/58 |
| 4,756,723 | 7/1988 | Sircar | 55/31 X |
| 4,770,676 | 9/1988 | Sircar et al. | 55/58 X |
| 4,775,396 | 10/1988 | Rastelli et al. | 55/58 |
| 4,784,672 | 11/1988 | Sircar | 55/31 X |
| 4,880,443 | 11/1989 | Miller et al. | 55/58 X |

FOREIGN PATENT DOCUMENTS

| | | | |
|---|---|---|---|
| 55-137026 | 10/1980 | Japan | 55/31 |
| 55-149621 | 11/1980 | Japan | 55/31 |

*Primary Examiner*—Robert Spitzer
*Attorney, Agent, or Firm*—Thomas K. McBride; John G. Tolomei; Warren K. Volles

[57] ABSTRACT

Adsorption processes are provided for separating a first component from a mixture with at least one other component by passing the mixture in vapor phase through a first adsorption zone comprising particulate adsorbent material having a minimum particle size and subsequently through a second adsorption zone comprising particulate adsorbent having a maximum particle size smaller than the particle size of the adsorbent in the first adsorption zone. In certain aspects of the invention wherein the process has a repetitive cycle sequence and a total cycle time of greater than about 30 seconds, the particle size of the adsorbent in the first adsorption zone is not less than about No. 14 mesh and the particle size of the adsorbent in the second adsorption zone is less than about No. 14 mesh. One specific aspect relates to the separation of hydrogen from a feed comprising hydrogen and at least one other component selected from the group consisting of carbon monoxide, methane and nitrogen by a pressure swing process.

34 Claims, No Drawings

MULTIPLE ZONE ADSORPTION PROCESS

FIELD OF THE INVENTION

This invention generally relates to an adsorption process and more specifically to vapor phase adsorption processes for the separation of a first component from a mixture of the first component with at least one other component wherein adsorption zones containing adsorbents having different particle sizes are utilized.

BACKGROUND OF THE INVENTION

Adsorption processes have been effectively utilized for a number of years to perform both bulk separations and purification separations in a variety of technology areas, e.g., hydrocarbon processing, hydrogen purification, air separation and pollution control. Despite the diversity of processes and particular applications, most adsorption processes are influenced by mass transfer limitations to one extent or another.

When a feed mixture is passed through an adsorber bed containing an activated adsorbent, i.e., one having adsorption capacity for at least one component present in the feed mixture, at suitable adsorption conditions, a mass transfer zone is established and advances through the adsorber bed as more feed is passed through the adsorbed bed. The term "mass transfer zone" is generally accepted in the art and denotes that section of the adsorber bed which is undergoing dynamic changes in both adsorbent loading of the adsorbate, i.e., component being adsorbed, and concentration of the adsorbate in the feed mixture. That is, at the leading edge of the mass transfer zone, and ahead of it, the adsorbate concentration is reduced relative to the feed and is substantially in equilibrium with the activated adsorbent, and at the trailing edge of the mass transfer zone, and behind it, the adsorbate concentration is substantially equal to that in the feed mixture and the adsorbent is substantially loaded to capacity with the adsorbate. The portion of the adsorbed bed behind the mass transfer zone is generally known as the equilibrium zone. See, for example, the discussion of mass transfer zone concepts and related adsorption topics in the publications: Lukchis, Adsorption Systems, Part I-Design by Mass-Transfer-Zone Concept, Chemical Engineering, June 11, 1973 at pp. 111-116; Lukchis, Adsorption Systems, Part II-Equipment Design, Chemical Engineering, July 9, 1973 at pp. 83-87; Lukchis, Adsorption Systems, Part III-Adsorbent Regeneration, Chemical Engineering, Aug. 6, 1973 at pp. 83-90.

The size, or length, of the mass transfer zone can be dependent on various factors well known in the art including the type of adsorbent, the particle size of the adsorbent, the gas velocity, the temperature of the feed mixture and the adsorbent and the concentration of the adsorbate. When the rate-controlling step in the adsorption process is diffusion of the adsorbate into the adsorbent particle, the particle size of the adsorbent can have a substantial effect on the size of the mass transfer zone. It is generally known by those skilled in the art that in such diffusion limited processes, adsorbents having smaller particle sizes can provide smaller mass transfer zones and hence, more efficient utilization of the adsorber bed. That is, when the mass transfer zone is smaller, i.e., more compact, more adsorbate can be loaded into the adsorbent before the leading edge of the mass transfer zone breaks through the effluent end of the adsorber bed. Hence, higher product purities and recoveries can be achieved and, therefore, the use of smaller particles is generally desirable.

However, everything else being equal, smaller particles cause higher pressure drop. Note, for example the Ergun equation which sets forth the relationship of pressure drop in a fixed bed:

$$\frac{\Delta P}{L} = \left[ \frac{150(1 - \epsilon)}{D_p} M + 1.75 G \right] \frac{1 - G}{\epsilon^3 D_p P_g}$$

where $\Delta P$ is the pressure drop across a bed of depth L; M and P are the viscosity and density of the mixture, respectively; G is the superficial mass flow rate; $\epsilon$ is the void fraction; and $D_p$ is the effective particle diameter and is defined as $D_p = 6V_p/A_p$ where $V_p$ and $A_p$ are the volume and external surface area of a single particle. See page 29, Section 4, R. H. Perry, C. H. Chilton, Chemical Engineer's Handbook, McGraw-Hill Book Company, New York, fifth edition, 1973. Higher pressure drops, in turn, cause increased lifting and crushing forces on the adsorbent bed as gases are passed therethrough. Since larger particles generally have a higher crush strength and can tolerate higher pressure drops, the choice of adsorbent particle size is often made on the basis of the pressure drop through the adsorber bed. The following adsorption processes describe the use of particulate adsorbents having various particle sizes.

U.S. Pat. No. 3,359,198 discloses methods for the treatment of recycle gas streams from continuous processing units by contact with a solid bed of adsorbent to remove undesirable components from the recycle gas. In one aspect of the invention, an enriched hydrogen purity recycle gas is produced by passing a recycle gas stream containing undesirable components through an adsorber bed containing adsorbent preferably comprising solid particles of a size range of from about 10 mesh to about 60 mesh and removing the purified product therefrom. The above-identified patent discloses that this size range is preferable since it will result in a significant pressure drop in the direction of flow through the fixed bed thereby insuring efficient contact of the gas with solid adsorbent and preventing channeling and bypassing of a portion of the bed.

U.S. Pat. No. 3,564,816 discloses a pressure swing adsorption process (PSA) for separating gas mixtures having selectively adsorbable components, as for example, CO, $CO_2$, $CH_4$ and other light saturated or unsaturated hydrocarbons, $NH_3$, $H_2S$, Ar, $N_2$ and $H_2O$ from hydrogen, and $O_2$, $N_2$ and $CO_2$ from air. Examples 1 and 2 of this patent, respectively, disclose the use of adsorber beds containing 1/16" calcium Zeolite A molecular sieve pellets to separate nitrogen from air and to separate nitrogen from admixture with hydrogen. In processes, such as described in the above-identified patent, adsorbent particles of about the size disclosed are often used in order to prevent damage to the particles due to excessive pressure drop and to provide a relatively constant pressure profile throughout the adsorber bed during the pressure changing steps, particularly during desorption steps when high residual pressures in portions of the adsorber bed can adversely effect the desorption of the adsorbate.

U.S. Pat. No. 4,176,053 discloses the separation of normal paraffins from a mixed paraffin feedstock by selective adsorption on crystalline zeolitic molecular sieves. One aspect of the patent provides a constant-pressure process wherein a non-adsorbable purge gas, e.g., hydrogen, is used to desorb the normal paraffins from a 1/16" calcium Zeolite A adsorbent.

U.S. Pat. No. 4,194,892 discloses a rapid adiabatic pressure swing process with a total cycle time of less than 30 seconds using a single adsorbent bed of No. 20×No. 120 mesh particles. In processes utilizing rapid pressure swing adsorption (RPSA), high pressure drops are generally desired and the use of small adsorbent particles provides the necessary flow resistance to operate the process. However, an excessive pressure drop even in RPSA can be disadvantageous. For example, as set forth at col. 9, lines 6, et seq., of the above-identified patent, an adsorber bed having too much resistance can have reduced product recovery. This patent discloses that the problem of reduced product recovery caused by excessive pressure drop can be solved by increasing the adsorbent particle size.

U.S. Pat. No. 4,608,061 discloses a PSA process for separating normal butane from mixtures thereof with isobutane by a particular sequence of countercurrent depressurization and purge steps. One aspect of the invention disclosed in the patent provides a pressure swing adsorption process for separating normal and isobutane using ⅛" diameter 5A molecular sieve adsorbent pellets.

The above-described patents set forth processes which utilize adsorbents having a particular particle size or particle size range selected to achieve a desired result with respect to either pressure drop or mass transfer limitations. Unfortunately, it has not been possible to obtain the benefits of smaller adsorbent particles, i.e., better mass transfer, in processes wherein low pressure drops are required.

In another patent, i.e., European Patent No. 0,128,998, an alternate approach to improving mass transfer characteristics is disclosed. The above-identified patent discloses a method for improving the dynamic adsorption properties, i.e., mass transfer, of pelleted sodium aluminosilicate zeolites characterized by treating the zeolites with aqueous mineral acid, i.e., HCl. However, this treatment can add complexity and increased costs to the manufacturing process. Moreover, as is known by those skilled in the art, acidic environments can be detrimental to adsorbents and can adversely affect the physical integrity thereof.

Accordingly, processes are sought which can combine the beneficial aspects of smaller particles, i.e., better mass transfer, with the beneficial aspects of larger particles, i.e., lower pressure drop without additional chemical treatments. Such processes are particularly desired in PSA processes wherein regeneration, i.e., desorption, is accomplished at low pressures. Because the regeneration is conducted at low pressure, the regeneration gas has a high volumetric flow rate and, hence, can cause higher pressure drops and reduced regeneration efficiency.

SUMMARY OF THE INVENTION

The present invention provides vapor phase adsorption processes which can have improved mass transfer characteristics without excessive pressure drop by utilizing two adsorption zones, one having smaller adsorbent particles to contain the mass transfer zone and another having larger adsorbent particles to contain the equilibrium zone. In this way, the problems associated with using smaller adsorbent particles throughout the adsorption system can be avoided, i.e., excessive pressure drop, while the beneficial aspects of smaller adsorbent particles can be retained, i.e., improved mass transfer.

In one aspect of the present invention, a process is provided for separating a first component from a mixture by passing the mixture in vapor phase through a first adsorption zone comprising particulate adsorbent material having an average particle size that exceeds a minimum average particle size and subsequently through a second adsorption zone comprising particulate adsorbent material having an average particle size that does not exceed a maximum average particle size, wherein the maximum average particle size does not exceed the minimum average particle size, at conditions effective to cause adsorption of at least a fraction of the mixture in the first adsorption zone and at least a fraction of the first component in the second adsorption zone and withdrawing a product depleted in the first component from a point downstream of the second adsorption zone.

In another aspect of the present invention, a process is provided for separating a first component from a mixture, wherein the process has a repetitive cycle sequence and a total cycle time of greater than about 30 seconds. The cycle sequence includes: (a) passing the mixture in vapor phase through a multiple zone adsorber bed comprising a first adsorption zone consisting essentially of one or more particulate adsorbents having a particle size not less than about No. 14 mesh and a second adsorption zone consisting essentially of one or more particulate adsorbents having a particle size less than about No. 14 mesh at a temperature and pressure sufficient to cause the selective adsorption of at least a fraction of the mixture in the first adsorption zone and at least a fraction of the first component in the second adsorption zone; (b) withdrawing a product depleted in the first component from the adsorber bed at a point downstream of the second adsorption zone; and (c) regenerating the adsorber bed by interrupting the flow of the mixture to the adsorber bed, desorbing the first component from the adsorber bed and recovering a regenerant stream comprising the first component.

In still yet another more specific aspect of the present invention, a process is provided for separating hydrogen from a feed comprising hydrogen and at least one other component including carbon monoxide, methane and nitrogen, wherein the cycle sequence is repetitive and has a total cycle time of greater than about 30 seconds. The cycle sequence includes the steps of: (a) passing the feed in vapor phase through an adsorber bed comprising a first adsorption zone consisting essentially of particulate adsorbent material comprising activated carbon and having a particle size not less than about No. 14 mesh and a second adsorption zone consisting essentially of particulate adsorbent material comprising zeolitic molecular sieve and having a particle size less than about No. 14 mesh, wherein the second adsorption zone comprises less than about one half of the total volume of adsorbent contained in the adsorber bed, at a temperature of from about 0° to about 300° F. and an adsorption pressure of from about 50 to 1000 psia and sufficient to cause the selective adsorption of at least a fraction of the feed in the first adsorption zone and at least a fraction of at least one other component in the second adsorption zone; (b) withdrawing a product enriched in hydrogen and depleted in the other component from the adsorber bed at a point downstream of the second adsorption zone; and (c) regenerating said adsorber bed by interrupting the flow of the feed, desorbing the other component by reducing the pressure in the adsorber to a pressure below the adsorption pressure and in a range of from about 1 to about 500 psia and recovering a regenerant stream comprising the other component.

DETAILED DESCRIPTION OF THE INVENTION

The present invention relates to adsorption processes for separating a first component from a mixture of the first component with at least one other component wherein two adsorption zones are provided, one containing particulate adsorbent material having smaller particle sizes than the particulate adsorbent material in the other adsorption zone.

The processes can be used to perform bulk separations or purification separations and accordingly has applicability to a wide variety of mixtures, i.e., feeds. More particularly, virtually any adsorption separation that is influenced by diffusion through adsorbent particles can be improved according to the present invention. Hence, the particular mixture to be separated is not critical to the processes of the present invention.

The term "first component" as used herein, denotes the particular adsorbate in the mixture which is to be adsorbed on the adsorbent. This first component can be considered the key component in the mixture, however, it may be present with other components which can also be adsorbed on the adsorbent. For example, in the separation of hydrogen from mixture of hydrogen with carbon monoxide, nitrogen and methane, it is frequently tolerable to have nitrogen present in the product but intolerable to have more than trace amounts of carbon monoxide present. In that situation, carbon monoxide would be the first component, i.e., key component, even though both nitrogen and methane may also be adsorbed on the adsorbent and even though significant quantities of nitrogen may break through and elute into the product.

Virtually any synthetic or naturally occuring particulate adsorbent material capable of maintaining its physical integrity during the adsorption process is suitable for use according to the present invention. Although there are a variety of such particulate adsorbent materials, including but not limited to activated carbons, activated clays, silica gel, activated alumina and crystalline molecular sieves, molecular sieves can be preferred for certain adsorption processes because of their uniform pore size, i.e., effective pore diameter. These molecular sieves include, for example, the various forms of silicoaluminophosphates, and aluminophosphates disclosed in U.S. Pat. Nos. 4,440,871; 4,310,440 and 4,567,027, hereby incorporated by reference, as well as zeolitic molecular sieves.

Zeolitic molecular sieves in the calcined form may be represented by the general formula:

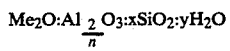

where Me is a cation, x has a value from about 2 to infinity and y has a value of from about 2 to 10 and n is the cation valence.

Typical well-known zeolites which may be used include, chabazite, also referred to as Zeolite D, clinoptilolite, erionite, faujasite, also referred to as Zeolite X and Zeolite Y, ferrierite, mordenite, Zeolite A, and Zeolite P. Detailed descriptions of the above-identified zeolites, as well as others, may be found in D. W. Breck, *Zeolite Molecular Sieves*, John Wiley and Sons, New York, 1974, hereby incorporated by reference. Other zeolites suitable for use according to the present invention are those having a high silica content, i.e., those having silica to alumina ratios greater than 10 and typically greater than 100. One such high silica zeolite is silicalite, as the term used herein includes both the silicapolymorph disclosed in U.S. Pat. No. 4,061,724 and also the F-silicalite disclosed in U.S. Pat. No. 4,073,865, hereby incorporated by reference.

The selection of the particular solid adsorbent will depend on factors such as its effective pore diameter and the particular end use intended. The term "effective pore diameter" is conventional in the art and is used herein to functionally define the pore size in terms of the size of molecules that can enter the pores rather than actual dimensions which are often difficult to determine as the pores are often irregularly shaped, i.e., non-circular; D. W. Breck, in *Zeolite Molecular Sieves*, John Wiley and Sons, New York, 1974, at pages 633 to 641, provides a discussion of effective pore diameter. Another such factor is the composition of the feed stream to be purified. For example, if removal of carbon dioxide is desired, one possible choice of the adsorbent would be activated carbon. This is due to the relative affinities of the adsorbent and adsorbates. Carbon dioxide is a relatively strong adsorbate whereas activated carbon is a relatively weak adsorbent. As used herein, it should be understood that the terms "strong" and "weak" adsorbents and adsorbates are applied at equal conditions of temperature and pressure. Such a combination is desirable for desorption purposes because the carbon dioxide adsorbate may be removed easily. If a very strong adsorbent, such as molecular sieves were employed, the desorption procedure would become much more elaborate and involved. A strong adsorbent, such as molecular sieves, would preferably be employed when the feed stream contains a relatively weak adsorbate, such as methane or carbon monoxide. A relatively weak adsorbent, such as activated alumina or silica gel, would preferably be employed when a given feed stream contains very strong adsorbates, such as benzene and toluene. If a strong adsorbent were used to adsorb a strong adsorbate, such as an aromatic compound, the desorption of the adsorbate from the adsorbent material would become extremely difficult. The selection of suitable adsorbents for a particular separation is generally known to those skilled in the art and need not be further elaborated upon herein.

The adsorption conditions used in the process of the present invention are highly dependent upon the particular separation to be performed and the adsorbent used but must be sufficient to cause adsorption of at least a fraction of said mixture in said first adsorption zone and at least a fraction of said first component in the second adsorption zone. Although the selection of adsorption conditions is generally known by those skilled in the art, in a broad aspect of this invention, the temperature can range from as low as about $-100$ to as high as about $800°$ F. and the pressures during adsorption cycles can range from about 0.1 to 1000 psia.

For example, the process of hereinbefore described U.S. Pat. No. 3,564,816, which discloses a pressure swing process for separating gas mixtures such as CO, $CO_2$, $CH_4$ and other light saturated or unsaturated hydrocarbons, $NH_3$, $H_2S$, $A_r$, $N_2$ and $H_2O$ from hydrogen, and $O_2$, $N_2$ and $CO_2$ from air, can effectively operate at about ambient temperature and within pressure ranges of about 15 to 245 psia.

Similarly, a relatively low temperature range of $-50°$ to $100°$ C. is disclosed in U.S. Pat. No. 4,755,396 which sets forth a process wherein carbon dioxide is selectively adsorbed and separated from non-acidic gases such as nitrogen, hydrogen and methane using a pressure swing adsorption process in a fixed adsorption bed containing a faujasite type of zeolitic aluminosilicate containing at least 20 equivalent percent of at least one cation species selected from the group consisting of zinc, rare earth, hydrogen and ammonium and containing not more than 80 equivalent percent of alkali metal or alkaline earth metal cations. This patent further sets forth a pressure range of from 2 to 1000 psia during adsorption and 0.1 to 500 psia during desorption.

In contrast, a relatively high temperature process is set forth in hereinbefore described U.S. Pat. No. 4,608,061 which relates to a pressure swing adsorption process for separating normal and isobutane and discloses a temperature range of from about 400° to about 600° F., and pressure range of from about 100 to 300 psia during adsorption to about 20 psia during desorption. Likewise, hereinbefore described U.S. Pat. No. 4,176,053 which relates to an adsorption process for separating normal paraffins from non-normal paraffins using a constant pressure purge process, discloses a temperature range of from about 350° to 750° F. and a pressure range of from about 50 to about 400 psia. The above-described U.S. Pat. Nos. 3,564,816; 4,755,396; 4,608,061 and 4,176,053 are hereby incorporated by reference.

In the process of the present invention, a first component is separated from a mixture of said first component and at least one other component by passing said mixture in vapor phase through a first adsorption zone comprising particulate adsorbent material having a minimum particle size and through a second adsorption zone comprising particulate adsorption material having a maximum particle size smaller than said minimum particle size at conditions effective to cause adsorption of at least a fraction of said first component on said particulate adsorbent material in the second adsorption zone and withdrawing a product depleted in said first component from a point downstream of the second adsorption zone. As previously set forth, the conditions effective to cause adsorption are dependent on the particular separation and are generally known to those skilled in the art.

The configuration of the first and second adsorption zones is such that the mixture is passed through the first adsorption zone before being passed through the second adsorption zone. This configuration is important because the efficiency of the adsorption process can be related to the amount of the adsorbent utilized when adsorption is terminated. Since the section of adsorbent occupied by the mass transfer zone is only partially utilized, it is desirable to make this section as small as possible. Hence, in accordance with the present invention, smaller adsorbent particles are utilized to decrease the size of the mass transfer zone and hence, improve the utilization of the adsorbent.

The problem of excessive pressure drop caused by the use of small adsorbent particles throughout the adsorber bed has been solved by applicant's recognition that since the section of adsorbent behind the mass transfer zone, i.e., upstream end, is essentially fully utilized when adsorption is terminated, smaller particles are only needed to decrease the length of the mass transfer zone at the downstream end of the bed. Hence, in accordance with the process of the present invention, particulate adsorbent material having an average size larger than a minimum average particle size is used in the first adsorption zone through which a mass transfer zone comprising said first component has preferably already passed when adsorption is terminated. In the second adsorption zone, a particulate adsorbent material is provided having an average size that is smaller than a maximum average particle size. The maximum average size of the adsorbent in the second adsorption zone is smaller than the minimum average particle size of the adsorbent in the first adsorption zone.

Surprisingly, applicant has found that only about one mass transfer zone length of small particle adsorbent is required to decrease the size of the mass transfer zone and achieve the benefits of applicant's invention, i.e., decreased mass transfer zone size with low pressure drop. Accordingly, the size or length of the second adsorption zone should be sufficient to contain at least one mass transfer zone length of said first component. Since larger particles can provide less pressure drop, the second adsorption zone preferably comprises less than one-half of the total adsorbent volume, and more preferably less than one-third of the total adsorbent volume.

The actual minimum and maximum particle sizes will be dependent on the particular adsorption process. For example, in RPSA processes, i.e., those processes having cycle times of less than about 30 seconds, particle sizes are often not larger than about No. 20 mesh. As used herein, mesh size ranges refer to standard U.S. Sieve Series commonly used for sizing small particles. Note, for example, Tables 21–12. U.S. Sieve Series and Tyler Equivalents, on page 21, Section 41, R. H. Perry, C. H. Chilton, *Chemical Engineers' Handbook*, McGraw-Hill Book Company, New York, fifth edition, 1973, hereby incorporated by reference. Accordingly, in an RPSA process, the particle size of the adsorbent used in the first adsorption zone might be not less than 40 mesh, e.g., No. 20×No. 40 mesh, while the particle size of the adsorbent used in the second adsorption zone might be less than 40 mesh, e.g., 60×80. In contrast, in a typical PSA process such as described in U.S. Pat. No. 3,564,816, particle sizes are often not smaller than about No. 14 mesh, i.e., an adsorbent pellet having a diameter of 1/16" would be within the size range of No. 12×No. 14 mesh as used herein. Hence, in a typical PSA process, the particle size of the adsorbent in the first adsorption zone might be ⅛" or 1/16" pellets or No. 8×No. 12 beads, and the particle size of the adsorbent in the second adsorption zone might be in the range of No. 20×No. 40 mesh.

Therefore, in accordance with the present invention, when processes having a repetitive cycle sequence and a total cycle time of greater than about 30 seconds are used, i.e., processes other than RPSA, the particle size of the adsorbent in the first adsorption zone is typically not less than No. 14 mesh, preferably between about No. 4 to No. 14 mesh, and the particle size of the adsorbent in the second adsorption zone is typically less than No. 14 mesh, preferably between about No. 16 to No. 40 mesh.

In broadest terms, the first and second adsorbent beds are characterized by an average particle size. An average particle size description is used in recognition of the fact that small quantities of particles that fall below or exceed the average minimum and maximum particles sizes in the first and second adsorption zones may become intermixed with other particles in a particular zone. Preferably, the size of essentially all of the particles in the first adsorption zone will be greater than the minimum average particle size and the size of essentially all of the particles in the second adsorption zone will be less than the maximum average particle size.

Other than the use of different average particle sizes described above, it is not critical how the first and second adsorption zones are arranged. The first and second adsorption zones can be contained within a single adsorber bed and moreover, can be contained within a single vessel. Occasionally, it may be desirable to utilize a second adsorption zone that is commonly shared with several first adsorption zones. In such a case, when a particular first adsorption zone is in a flow path with the commonly shared second adsorption zone, the two adsorption zones would comprise a single adsorber bed, yet be contained in separate vessels. When both the first and second adsorption zones are contained within a single vessel, it may be desirable to provide a plurality of vessels connected in parallel with the appropriate valving and manifolds. Moreover, in other instances, it may be desirable to utilize radial flow adsorber beds wherein the gases are fed inwardly or outwardly along the radial axis of the adsorber bed as opposed to the longitudinal axis. Such arrangements are known to those skilled in the art of adsorption processes and need not be further described herein.

In some instances when the first and second adsorption zones are contained within a single adsorber bed, the first and second adsorption zones will be discontinuous, that is they may be separated by a space, or screen, for example. In other instances, the first and second adsorption zones will be continuous and, as a result, some intermixing can occur between the particles at the interface between the zones. Moreover, the adsorber bed can include a third zone located between the first and second zones that contains a blend of particles from the first and second zones.

The first and second adsorption zones can contain within themselves more than one type of particulate adsorbent material. When more than one type of particulate adsorbent material is contained in one or both of the first and second adsorption zones, the adsorbents can be intermixed although it is generally preferred that the adsorbents be arranged in layers without substantial intermixing. Alternately, both the first and second adsorption zones can comprise the same particulate adsorbent material, that is, the adsorbent in both the first and second zones will have the same composition. The selection of the particular adsorbent or adsorbents used in the first and second adsorption zones will be dependent upon the particular separation to be performed and can be determined by those skilled in the art of adsorption as hereinbefore described.

In some instances, the first component will be present in the mixture with at least one other adsorbable component that may be adsorbed along with the first component. In such instances, individual mass transfer zones for each adsorbate can form and pass through the adsorption zones in a chromatographic manner such that upon continued feeding, the less strongly adsorbed adsorbates would elute from the second adsorption zone before the more strongly adsorbed adsorbates. It is to be understood that the particular adsorbate which is selected as the first component can be any of the adsorbates present in the mixture and need not be the least strongly adsorbed component. Moreover, the first component can be adsorbed in both the first and second adsorption zones despite the fact that there may be other adsorbates present in the feed.

In aspects of the invention wherein the processes have a repetitive cycle sequence, a regeneration step must be performed in order to desorb the adsorbed components and restore sufficient adsorption capacity to the particulate adsorbent materials contained in the first and second adsorption zones to permit cyclic operation. This regeneration can be performed in a number of ways well known to those skilled in the art. For example, in pressure swing cycles, the pressure is reduced below that at which adsorption had occurred in order to regenerate the adsorbent. In the process of the present invention, when a pressure swing cycle is employed, the pressure range suitable for regenerating the adsorbent is below the pressure at which the selective adsorption of the first component had occurred and sufficient to cause the first component to desorb from the adsorber bed, preferably from about 1 to about 500 psia. Regeneration can also be accomplished or enhanced by passing a sufficient quantity of a purge gas through the adsorption zones in order to cause the first component to desorb from the adsorber bed. Examples of suitable purge gases for use according to this invention are hydrogen and nitrogen. Thermal swing methods, i.e., regeneration by heating the adsorption zones to a temperature sufficient to cause the first component to desorb from the adsorber bed, may also be suitable.

The process of the present invention may be practiced to perform a variety of vapor phase adsorptive separations as hereinbefore described. Some specific examples of separations which can be performed in accordance with the present invention include; the bulk separation of air to provide a product enriched in oxygen wherein both the first and second adsorption zones comprise Zeolite A, preferably the calcium or sodium ion-exchanged forms, and the first component is nitrogen; the separation of carbon dioxide from mixtures thereof with methane to produce a product depleted with respect to carbon dioxide wherein both the first and second adsorption zones comprise a faujasite type zeolite, preferably Zeolite X or Zeolite Y containing at least 20 equivalent percent of at least one cation species selected from the group consisting of zinc, rare earth, hydrogen and ammonium and containing not more than 80 equivalent percent of alkali metal or alkaline earth metal cations, and carbon dioxide is the first component; and the separation of normal butane from mixtures thereof with isobutane wherein both the first and second adsorption zone comprise the calcium ion-exchanged form of Zeolite A and the first component is normal butane.

One specific aspect of the present invention relates to a process for separating hydrogen from a feed comprising hydrogen and at least one other component selected from the group consisting of carbon monoxide, methane and nitrogen. The process has a repetitive cycle sequence and a total cycle time of greater than about 30 seconds and comprises the steps of (a) passing said feed in vapor phase through an adsorber bed comprising a first adsorption zone consisting essentially of particulate adsorbent material comprising activated carbon and having a particle size not less than about No. 14 mesh and a second adsorption zone consisting essentially of particulate adsorbent material comprising zeolitic molecular sieve and having a particle size less than about No. 14 mesh, said second adsorption zone comprising less than about one half of the total volume of adsorbent contained in said adsorbed bed, at a temperature of from about 0° to about 300° F. and an adsorption pressure of from about 50 to 1000 psia and sufficient to cause the selective adsorption of at least a fraction of the feed in the first adsorption zone and at least a fraction of said other component in the second adsorption zone; (b) withdrawing a product enriched in hydrogen and depleted in said other component from said adsorber bed at a point downstream of the second adsorption zone; (c) and regenerating said adsorber bed by interrupting the flow of said feed, desorbing said other component by reducing the pressure in said adsorber to below said adsorption pressure and in a range of from about 1 to about 500 psia and recovering a regenerant stream comprising said other component.

In addition to activated carbon, the first adsorption zone can additionally comprise other adsorbents such as silica gel, activated alumina or zeolitic molecular sieve. When such other adsorbents are used, it is preferred that they are substantially segregated from the activated carbon and from each other if more than one are used, although some intermixing can occur at the interface thereof. Similarly, it may be desirable that the second adsorption zone comprise additional adsorbents, e.g., activated carbon.

The process of the above-described aspect of the present invention preferably comprises passing the feed which comprises from about 20 to about 99 mol % hydrogen and from about 0.1 to about 10 mol % carbon monoxide through said adsorber bed at a molar flux of from about 10 to about 100 lb mol/hr/ft$^2$, more preferably from about 30 to 60 lb mol/hr/ft$^2$, and at a temperature of from about 50° to about 150° F. and at a pressure of from about 200 to 400 psia, withdrawing a product from a point downstream of the second adsorption zone comprising less than about 10 parts per million of carbon monoxide and desorbing said other component by reducing the pressure in said adsorber to from about 14.7 to about 50 psia and thereafter passing hydrogen-containing purge gas therethrough for enhanced regeneration.

The following examples are provided for illustrative purposes and are not intended to be limitations on the scope of the claims that follow.

EXAMPLE 1

An adsorption test was performed to establish a baseline performance level for a typcal PSA separation. The test was performed in an adsorption system having five adsorber beds, each bed having dimensions of about 3½ inches diameter by about 4 feet long. Each adsorber bed was loaded with 7 pounds of 1/16 inch pelleted activated carbon adsorbent in the feed end and about 3 pounds of 1/16 inch pelleted 5A adsorbent in the effluent end, both of which can be obtained from UOP, Des Plaines, IL.

The adsorption cycle consisted of adsorption at 320 psia, three cocurrent equalization steps to 250, 165 and 95 psia respectively, cocurrent depressurization to 35 psia to provide purge gas, countercurrent depressurization to 22 psia, countercurrent purge with purge gas and repressurization.

The feed gas represented a typical steam reformer product gas and had a composition of about 75 mol. % $H_2$, 5 mol. % $CH_4$, 2 mol. % CO and 18 mol. % $CO_2$.

The feed gas was passed to the adsorber bed at a molar flux of 25 lb moles/hr/ft$^2$.

The performance of the process was evaluated according to the following parameters.

(1) Product Purity-The product purity was maintained at 10 ppm CO or less.

(2) Adsorbent Quantities-The adsorbent quantity to feed gas ratio was measured in terms of ft$^3$ adsorbent/1000 SCFH feed gas. Lower values represent more favorable performance.

(3) Pressure Drop-The pressure drop was measured in terms of ΔP/ft of bed length during the purge step. Lower values represent more favorable performance.

(4) Purge Quantity-The purge quantity was measured in terms of moles purge/100 moles feed gas. Lower values represent more favorable performance.

(5) Recovery-The hydrogen product recovery was measured as a percentage of feed gas hydrogen. Higher values represent more favorable results.

For the baseline run with standard sized adsorbent particles the above-identified performance parameters were as follows:

(1) Product Purity: 10 ppm CO
(2) Adsorbent Quantity: 2.0 f$^3$/1000 SCFH
(3) Pressure Drop: 0.16 psi/ft
(4) Purge Quantity: 10 mol purge/100 mol feed
(5) Recovery: 87%.

EXAMPLE 2

The adsorption system and adsorption cycle described in Example 1 was simulated by mathematical modelling in Example 2. The adsorber beds were simulated to contain the same type and quantity of adsorbents as in Example 1 but having a size of 16×20 mesh instead of 1/16 inch pellets.

For the small particle run with smaller sized adsorbent particles the above-identified performance parameters were as follows:

(1) Product Purity: 10 ppm CO
(2) Adsorbent Quantity: 1.9 f$^3$/1000 SCFH
(3) Pressure Drop: 0.50 psi/ft
(4) Purge Quantity: 9 mol purge/100 mol feed
(5) Recovery: 88%.

It can be seen that for the same product purity all process parameters other than pressure drop were directionally better than in Example 1. The pressure drop was substantially worse than in Example 1.

EXAMPLE 3

The adsorber beds and adsorption cycle described for Example 1 were used for testing in Example 3. However, the adsorber beds were loaded with about 7 pounds of the 1/16 inch pelleted activated carbon adsorbent of Example 1 in the feed end of the bed and about 3 pounds of 16×20 mesh 5A adsorbent of Example 2 in the effluent end of the bed.

For the mixed particle run with small and large sized adsorbent particles the above-identified performance parameters were as follows:

(1) Product Purity: 10 ppm CO
(2) Adsorbent Quantity: 1.8 f$^3$/1000 SCFH
(3) Pressure Drop: 0.16 psi/ft
(4) Purge Quantity: 8 mol purge/100 mol feed
(5) Recovery: 89%.

It can be seen that for the same product purity all process parameters were directionally better than Example 1, except for pressure drop which was essentially the same. While one might expect the process of Example 3 to have a higher pressure drop than Example 1 due to the smaller particles, such is not the case since the purge quantity is surprisingly lowered. Even more surprising is the fact that each process parameter is better in Example 3, i.e., mixed particle process, than in Example 2, small particle process.

What is claimed is:

1. A process for separating a first component from a mixture of said first component and at least one other component by passing said mixture in vapor phase through a first adsorption zone comprising particulate adsorbent material having an average particle size that exceeds a minimum average particle size and subsequently through a second adsorption zone comprising particulate adsorbent material having an average particle size that does not exceed a maximum average particle size, wherein said maximum average particle size does not exceed said minimum particle size, at conditions effective to cause adsorption of at least a fraction of said mixture in the first adsorption zone and at least a fraction of said first component in the second adsorption zone and withdrawing a product depleted in said first component from a point downstream of the second adsorption zone.

2. The process of claim 1 wherein the first and second adsorption zones are contained within a single vessel.

3. The process of claim 2 wherein the first and second adsorption zones are continuous and form an interface therebetween.

4. The process of claim 3 wherein a third adsorption zone is located between the first and second adsorption zones, said third adsorption zone containing a blend of particulate adsorbent material from the first and second adsorption zones.

5. The process of claim 2 wherein a plurality of the vessels are provided in parallel.

6. The process of claim 1 wherein the first and second adsorption zones are discontinuous.

7. The process of claim 1 wherein said particulate adsorbent material in the first adsorption zone has the same composition as said particulate adsorbent material in the second adsorption zone.

8. The process of claim 1 wherein the first adsorption zone comprises more than one type of particulate adsorbent material.

9. The process of claim 1 wherein the second adsorption zone comprises more than one type of particulate adsorbent material.

10. The process of claim 1 wherein the conditions effective to cause adsorption of said first component on said particulate adsorbent in the second adsorption zone include a temperature of from about $-100°$ to about $800°$ F. and a pressure of from about 50 to about 1000 psia.

11. The process of claim 1 wherein the second adsorption zone comprises a sufficient quantity of said particulate adsorbent material to contain at least one mass transfer zone length of said first component.

12. The process of claim 1 wherein said first component is adsorbed on said particulate adsorbent material in both the first and second adsorption zones.

13. The process of claim 1 wherein said mixture comprises at least one other adsorbable component in addition to said first component.

14. A process for separating a first component from a mixture of said first component and at least one other component, said process having a repetitive cycle sequence and a total cycle time of greater than about 30 seconds, said cycle sequence comprising:
(a) passing said mixture in vapor phase through a multiple zone adsorber bed comprising a first adsorption zone consisting essentially of one or more particulate adsorbents having a particle size not less than about No. 14 mesh and a second adsorption zone consisting essentially of one or more particulate adsorbents having a particle size less than about No. 14 mesh at a temperature and pressure sufficient to cause the selective adsorption of at least a fraction of said mixture in said first adsorption zone and at least a fraction of said first component in the second adsorption zone;
(b) withdrawing a product depleted in said first component from said adsorber bed at a point downstream of the second adsorption zone; and
(c) regenerating said adsorber bed by interrupting the flow of said mixture to said adsorber bed, desorbing said first component from said adsorber bed and recovering a regenerant stream comprising said first component.

15. The process of claim 14 wherein said first component is carbon monoxide and said mixture further comprises hydrogen.

16. The process of claim 15 wherein said particulate adsorbent material in the first adsorption zone comprises zeolitic molecular sieve and said particulate adsorbent material in the second adsorption zone comprises activated carbon.

17. The process of claim 14 wherein said first component is carbon dioxide and said mixture further comprises methane.

18. The process of claim 17 wherein the particulate adsorbent material in the first and second adsorption zones comprises a zeolitic molecular sieve of the faujasite type.

19. The process of claim 14 wherein said first component is nitrogen and said mixture further comprises oxygen.

20. The process of claim 19 wherein said particulate adsorbent material in both the first adsorption zone and the second adsorption zone comprises zeolitic molecular sieve.

21. The process of claim 14 wherein said first component is normal butane and said mixture further comprises isobutane.

22. The process of claim 21 wherein the particulate adsorbent material in the first and second adsorption zones comprises 5A zeolitic molecular sieve.

23. The process of claim 14 wherein the first adsorption zone consists essentially of one or more particulate adsorbent materials having particles in a range of from about No. 4 to about No. 14 mesh.

24. The process of claim 14 wherein the second adsorption zone consists essentially of one or more particulate adsorbent materials having particles in a range of from about No. 16 to about No. 40 mesh.

25. The process of claim 14 wherein said desorbing is accomplished by reducing the pressure in said adsorber bed to a pressure below the selective adsorption pressure of said first component.

26. The process of claim 14 wherein said desorbing is accomplished by passing a purge gas through said adsorber bed.

27. A process for separating hydrogen from a feed comprising hydrogen and at least one other component selected from the group consisting of carbon monoxide, methane and nitrogen, said process having a repetitive cycle sequence and a total cycle time of greater than about 30 seconds, said cycle sequence comprising:
- (a) passing said feed in vapor phase through an adsorber bed comprising a first adsorption zone consisting essentially of particulate adsorbent material comprising activated carbon and having a particle size not less than about No. 14 mesh and a second adsorption zone consisting essentially of particulate adsorbent material comprising zeolitic molecular sieve and having a particle size less than about No. 14 mesh, said second adsorption zone comprising less than about one half of the total volume of adsorbent contained in said adsorber bed, at a temperature of from about 0° to about 300° F. and an adsorption pressure of from about 50 to 1000 psia and sufficient to cause the selective adsorption of at least a fraction of said feed in said first adsorption zone and of at least a fraction of said other component in said second adsorption zone;
- (b) withdrawing a product enriched in hydrogen and depleted in said other component from said adsorber bed at a point downstream of the second adsorption zone; and
- (c) regenerating said adsorber bed by interrupting the flow of said feed, desorbing said other component by reducing the pressure in said adsorber to a pressure below said adsorption pressure and in a range from about 1 to about 500 psia and recovering a regenerant stream comprising said other component.

28. The process of claim 27 wherein said particulate adsorbent material in the first adsorption zone further comprises silica gel.

29. The process of claim 28 wherein said silica gel is substantially segregated from said activated carbon.

30. The process of claim 27 wherein the second adsorption zone comprises less than about one-third of the total volume of adsorbent contained in said adsorber bed.

31. The process of claim 27 comprising passing said feed through said adsorber bed at a molar flux of from about 10 to about 100 lb mol/hr/ft$^2$.

32. The process of claim 27 comprising passing said feed through said adsorber bed at a temperature of from about 50° to about 150° F. and at a pressure of from about 200 to about 400 psia and desorbing said other component by reducing the pressure in said adsorber to from about 14.7 to about 50 psia.

33. The process of claim 27 wherein said feed comprises from about 20 to about 99 mol % hydrogen and from about 0.1 to about 10 mol % carbon monoxide.

34. The process of claim 33 wherein said product has less than about 10 parts per million of carbon monoxide.

* * * * *